Dec. 20, 1955  R. VARIN  2,727,490
MECHANICAL OPERATED TEAT CUP
Filed March 22, 1954
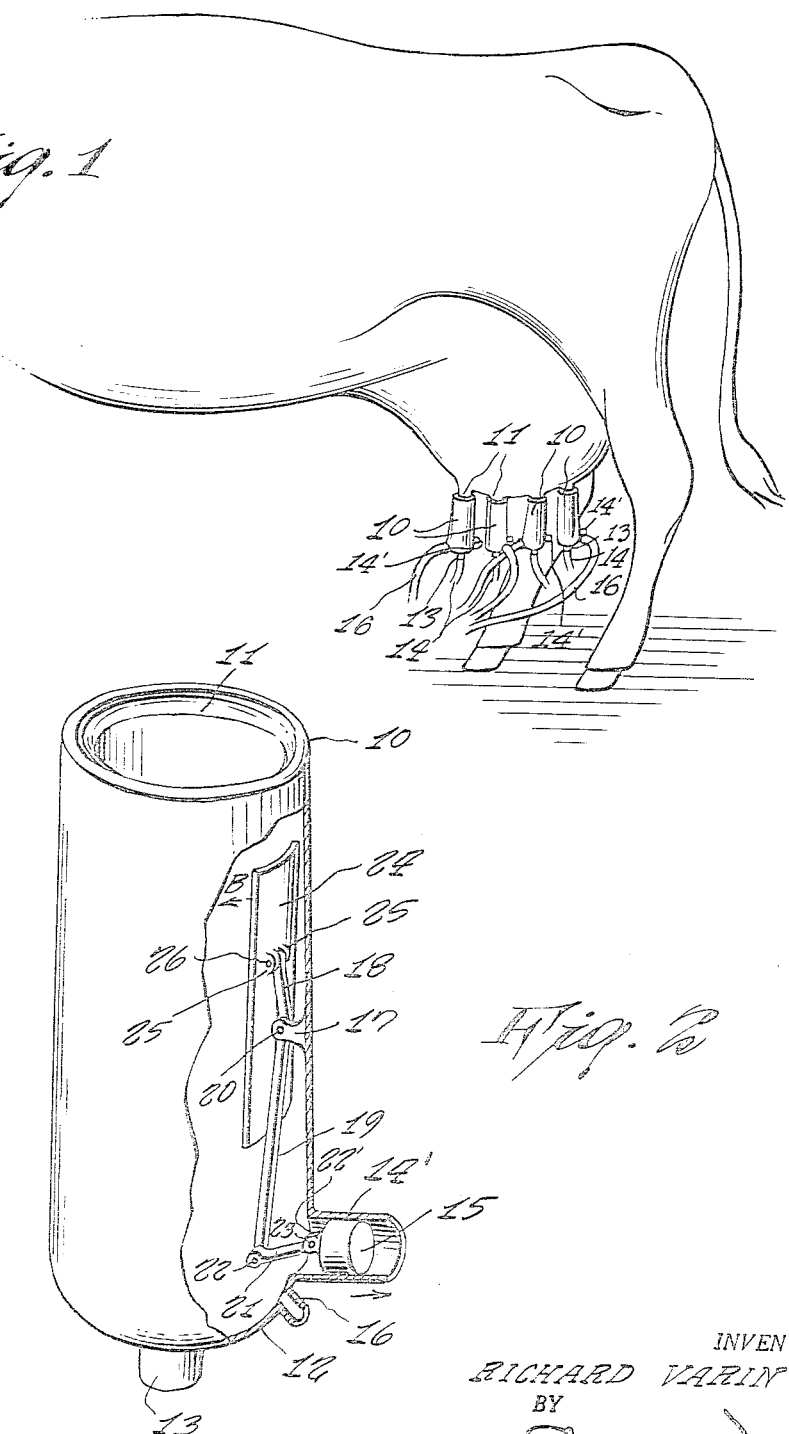
INVENTOR.
RICHARD VARIN
BY
Carl Miller
ATTORNEY

United States Patent Office 2,727,490
Patented Dec. 20, 1955

2,727,490
MECHANICAL OPERATED TEAT CUP

Richard Varin, Randall, N. Y.

Application March 22, 1954, Serial No. 417,606

2 Claims. (Cl. 119—14.26)

This invention relates to teat cups for milking cows.

It is an object of the present invention to provide improved teat cups for milking cows which in addition to comprising a pulsating teat cup includes a pressure plate for squeezing the cow's teat.

It is another object of the present invention to provide a teat cup of the above type wherein as the teat cup collapses against the teat, the pressure plate will cooperate therewith to supply milk to the conventional milk receiving machine.

Other objects of the present invention are to provide a teat cup bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a perspective view showing a plurality of teat cups embodying the features of the present invention in operative use in milking a cow and Fig. 2 is an enlarged perspective view of the invention, shown partly in cross section to show the mechanism therein.

Referring now more in detail to the drawing, a substantially cylindrical teat cup 10 of rubber or other suitable material is provided with a top opening 11 receiving the cow teat downwardly therethrough and is closed at the bottom, as at 12, and includes a milk outlet 13 adapted to be connected to the conventional milk receiving machine by means of the tubes 14.

The teat cup 10 near the bottom 12 is formed with a cylindrical portion 14' within which reciprocates a piston 15 for a purpose which will hereinafter become clear. An outlet 16 is provided in the bottom 12 adjacent the cylindrical portion 14'. A bearing bracket 17 is mounted within the cup and rotatably mounts a link having an upper portion 18 and a lower portion 19 by means of a pin 20. The lower end of the portion 19 of the link is pivotally connected to a link 21 by a pin 22, the other end of link 21 being pivotally connected to the piston 15 by means of the ears 22' and pin 23. A curved pressure plate 24 is formed on its outer face with the laterally spaced lugs 25 which pivotally receive therebetween the upper end of the link 18 by means of a pin 26. Thus, upon movement of the piston 15 in the direction of the arrow of Fig. 2 the pressure plate 24 will move against the teat in the direction of the arrow B.

In operation, the cylinder 14' and outlet 16 are connected to alternating vacuum lines having the same action as that employed in the common windshield wipers of cars. When the line to the outlet 16 is under vacuum, the teat cup 10 will collapse. The piston will then move counter the direction of the arrow and release the pressure plate 24 against the cow teat. When for instance atmospheric pressure is supplied to the outlet 16, the teat cup will expand and the piston 15 will then move in the direction of the arrow to bring the pressure plate 24 to bear against the cow teat. The lines 14 will then deliver the milk to the milk receiving machine.

The mechanism for pulsing cylinder 14' and connection 16 is not part of the present invention and any conventional, known device may be used for this purpose, as for instance the pulsator disclosed in British Patent No. 324,140.

While various changes may be made in the detail construction, it shall be understood that such changes shall be within the spirit and scope of the present invention as defined by the appended claims.

Having thus set forth and disclosed the nature of my invention, what is claimed is:

1. A teat cup comprising a collapsible member open at its top and having an outlet at its bottom, said collapsible member being adapted to receive therein the cow teat, said bottom outlet being adapted to be connected with a milk receiving machine, a pressure plate disposed longitudinally within said teat cup, a substantially V-shaped link pivotally mounted intermediate its ends on the inner wall of said teat cup, the upper end of the link being pivotally connected to said pressure plate, a cylindrical projection disposed near the bottom of said teat cup and communicating with the latter, a piston reciprocating in said cylindrical projection, a link pivotally connecting the lower end of said link with said piston, means for reciprocating said piston, and means for alternately inflating and collapsing said teat cup.

2. A teat cup according to claim 1, in which said means for alternately collapsing and inflating said teat cup include means for alternately subjecting said teat cup to vacuum and pressure, respectively, so that said piston performs an inward stroke if said teat cup is subjected to vacuum and an outward stroke if said teat cup is subjected to pressure.

References Cited in the file of this patent

UNITED STATES PATENTS

| 774,579 | Gillies | Nov. 8, 1904 |
| 1,057,486 | Kupfer | Apr. 1, 1913 |
| 2,334,481 | Silveira | Nov. 16, 1943 |
| 2,470,169 | Howse | May 17, 1949 |